US011990681B2

(12) United States Patent
Boyarsky et al.

(10) Patent No.: US 11,990,681 B2
(45) Date of Patent: *May 21, 2024

(54) PHASE DIVERSITY INPUT FOR AN ARRAY OF TRAVELING-WAVE ANTENNAS

(71) Applicant: DUKE UNIVERSITY, Durham, NC (US)

(72) Inventors: Michael Boyarsky, Durham, NC (US); Seyedmohammadreza Faghih Imani, Tempe, AZ (US); David R. Smith, Durham, NC (US)

(73) Assignee: Duke University, Durham, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/142,408

(22) Filed: May 2, 2023

(65) Prior Publication Data

US 2023/0352849 A1 Nov. 2, 2023

Related U.S. Application Data

(63) Continuation of application No. 17/102,310, filed on Nov. 23, 2020, now Pat. No. 11,670,867.

(Continued)

(51) Int. Cl.
*H01Q 21/00* (2006.01)
*H01Q 13/20* (2006.01)

(52) U.S. Cl.
CPC ......... *H01Q 21/0037* (2013.01); *H01Q 13/20* (2013.01)

(58) Field of Classification Search
CPC ...... H01Q 13/20; H01Q 13/206; H01Q 13/22; H01Q 21/0037; H01Q 21/005
See application file for complete search history.

(56) References Cited

U.S. PATENT DOCUMENTS 7,522,124 B2 4/2009 Smith et al.
8,120,546 B2 2/2012 Smith et al.

(Continued)

FOREIGN PATENT DOCUMENTS

WO 2006023195 A2 3/2006

OTHER PUBLICATIONS

Z. Jacob et al., "Optical hyperlens: Far-field imaging beyond the diffraction limit," Opt. Exp. 14, 8247 (2006).

(Continued)

*Primary Examiner* — Daniel Munoz
(74) *Attorney, Agent, or Firm* — Kory D. Christensen

(57) ABSTRACT

An apparatus includes a traveling-wave antenna array comprising a plurality of adjacent metamaterial surface antennas comprising a waveguide or a cavity, each adjacent metamaterial surface antenna comprising an array of metamaterial radiators coupled to a surface of the waveguide or the cavity, each metamaterial radiator comprising an individually addressable tunable component that can be tuned over a spectral bandwidth to generate different radiation patterns. The apparatus further includes a phase diversity feed coupled to the traveling-wave antenna array and configured to provide adjustable phase diverse input to two or more of the plurality of adjacent metamaterial surface antennas, the phase diverse input comprising a first phase for a first traveling-wave antenna and a second phase for a second traveling-wave antenna, the first phase being different from the second phase, wherein the phase diverse input is selected to suppress grating lobes for a directed beam pattern selected for transmission.

15 Claims, 12 Drawing Sheets

Related U.S. Application Data

(60) Provisional application No. 62/938,703, filed on Nov. 21, 2019.

(56) References Cited

U.S. PATENT DOCUMENTS

| | | | |
|---|---|---|---|
| 8,207,907 | B2 | 6/2012 | Hyde et al. |
| 9,385,435 | B2 | 7/2016 | Bily et al. |
| 2010/0156573 | A1 | 6/2010 | Smith et al. |
| 2012/0194399 | A1 | 8/2012 | Bily et al. |
| 2015/0318618 | A1 | 11/2015 | Chen et al. |
| 2015/0318620 | A1 | 11/2015 | Black et al. |
| 2015/0372389 | A1 | 12/2015 | Chen et al. |
| 2015/0380828 | A1 | 12/2015 | Black et al. |
| 2016/0099500 | A1* | 4/2016 | Kundtz .................... H01Q 3/30 342/371 |
| 2019/0273324 | A1 | 9/2019 | Sasaki et al. |
| 2020/0200866 | A1 | 6/2020 | Lynch et al. |
| 2020/0295466 | A1 | 9/2020 | Foo |
| 2020/0335873 | A1 | 10/2020 | Achour |

OTHER PUBLICATIONS

A. Salandrino and N. Engheta, "Far-field subdiffraction optical microscopy using metamaterial crystals: Theory and simulations," Phys. Rev. B 74, 075103 (2006).

M. S. Rill et al., "Photonic metamaterials by direct laser writing and silver chemical vapour deposition," Nature Materials advance online publication, May 11, 2008.

V. Shalaev, "Optical negative-index metamaterials," Nature Photonics 1, 41 (2007).

S. Linden et al., "Photonic metamaterials: Magnetism at optical frequencies," IEEE J. Select. Top. Quant. Elect. 12, 1097 (2006).

D. Smith et al., "Metamaterials negative refractive index." Science 305, 788 (2004).

J. B. Pendry et al., "Magnetism from conductors and enhanced nonlinear phenomena," IEEE Trans. Micro. Theo. Tech. 47, 2075 (1999).

M. Boyarsky, "Metasurface Antennas for Synthetic Aperture Radar," Dissertation, Department of Electrical and Computer Engineering, Duke University (2019).

M. Boyarsky et al., "Grating lobe suppression in metasurface antenna arrays with a waveguide feed layer," Optics Express, vol. 28, No. 16 (2020).

M. Boyarsky, "Electronically Steered Metasurface Antenna," Center for Metamaterials and Integrated Plasmonics, Department of Electrical and Computer Engineering, Duke University, Durham, NC, USA (2020).

A. K. Sarychev and V. M. Shalaev, Electrodynamics of Metamaterials, World Scientific, (2007).

A. J. Hoffman, "Negative refraction in semiconductor metamaterials," Nature Materials 6, 946 (2007).

G. Dewar, "A thin wire array and magnetic host structure with n<0," J. Appl. Phys. 97, 10Q101 (2005).

N. Engheta and R. W. Ziolkowski, eds., Metamaterials. Physics and Engineering Explorations, Wiley-Interscience (2006), ISBN: 978-0-471-76102-0.

C. Caloz, and T. Itoh, Electromagnetic Metamaterials, Transmission Line Theory and Microwave Applications, Wiley-Interscience, (2006), ISBN-10: 0-471-66985-7, ISBN-13: 978-0-471-66985-2.

* cited by examiner

PHASE DIVERSITY INPUT FOR AN ARRAY OF TRAVELING-WAVE ANTENNAS

CROSS-REFERENCE TO RELATED APPLICATIONS

This application is a continuation of U.S. patent application Ser. No. 17/102,310, filed Nov. 23, 2020, for "PHASE DIVERSITY INPUT FOR AN ARRAY OF TRAVELING-WAVE ANTENNAS," which claims priority under 35 U.S.C. § 119(e) to Provisional Patent App. No. 62/938,703, filed on Nov. 21, 2019, both of which are incorporated herein by reference.

GOVERNMENT LICENSE RIGHTS STATEMENT

This invention was made with government support under Federal Grant No. NR0000-18-C-0135 awarded by the National Reconnaissance Office. The government has certain rights in the invention.

TECHNICAL FIELD

The present disclosure generally relates to traveling-wave antenna systems, and more particularly, to suppressing grating lobes in traveling-wave antenna systems.

BACKGROUND

Traveling-wave antenna arrays have been developed and offer many advantages over other antenna arrays. Specifically, traveling-wave antenna arrays often have a wider bandwidth than traditional antenna arrays. Further, traveling-wave antenna arrays can be cheaper than traditional antenna arrays. One example of a traveling-wave antenna array is a traveling-wave metasurface antenna array. Traveling-wave metasurface antennas typically comprise waveguide structures that include an array of radiating irises in one of the surfaces of the waveguide. For a passive and resonant metamaterial iris, complete control over the phase and amplitude is difficult, if not impossible. Specifically, the phase and amplitude of each iris are linked through the fundamental characteristics of the resonance. For beamforming, the restricted phase range and the link between phase and amplitude can require that an approximate set of weights (selection of each resonator's resonance frequency) be chosen. For a strictly steered beam, which typically requires a monotonically increasing phase and constant amplitude, even the best choice of weights for the elements implies the possibility of grating lobes, e.g. since the constant phase advance implies a periodically modulated amplitude. These grating lobes can be avoided or otherwise suppressed through the use of high dielectrics within the waveguide and dense element spacing, e.g. with respect to the free-space wavelength. However, these approaches can limit efficiency, increase overall system costs, and introduce difficulties with modeling for both design and control.

SUMMARY

In various embodiments, an apparatus comprises a traveling-wave antenna array comprising a plurality of adjacent traveling-wave antennas. The apparatus also comprises a phase diversity feed coupled to the traveling-wave antenna array. The phase diversity feed can be configured to provide phase diverse input to two or more of the plurality of adjacent traveling-wave antennas.

In various embodiments, a method comprises selecting an input to provide to a traveling-wave antenna array. The traveling-wave antenna array comprises a plurality of adjacent traveling-wave antennas. The input can include a phase diverse input to provide to two or more of the plurality of adjacent traveling-wave antennas. The method also comprises providing the input to a phase diversity feed coupled to the traveling-wave antenna array to provide the phase diverse input to the two or more of the plurality of adjacent traveling-wave antennas through the phase diversity feed.

In various embodiments, a method of manufacture includes selecting an input to feed to a traveling-wave antenna array comprising a plurality of adjacent traveling-wave antennas. The input can be provided during operation of the traveling-wave antenna array through a phase diversity feed.

DETAILED DESCRIPTION

Figure 1:
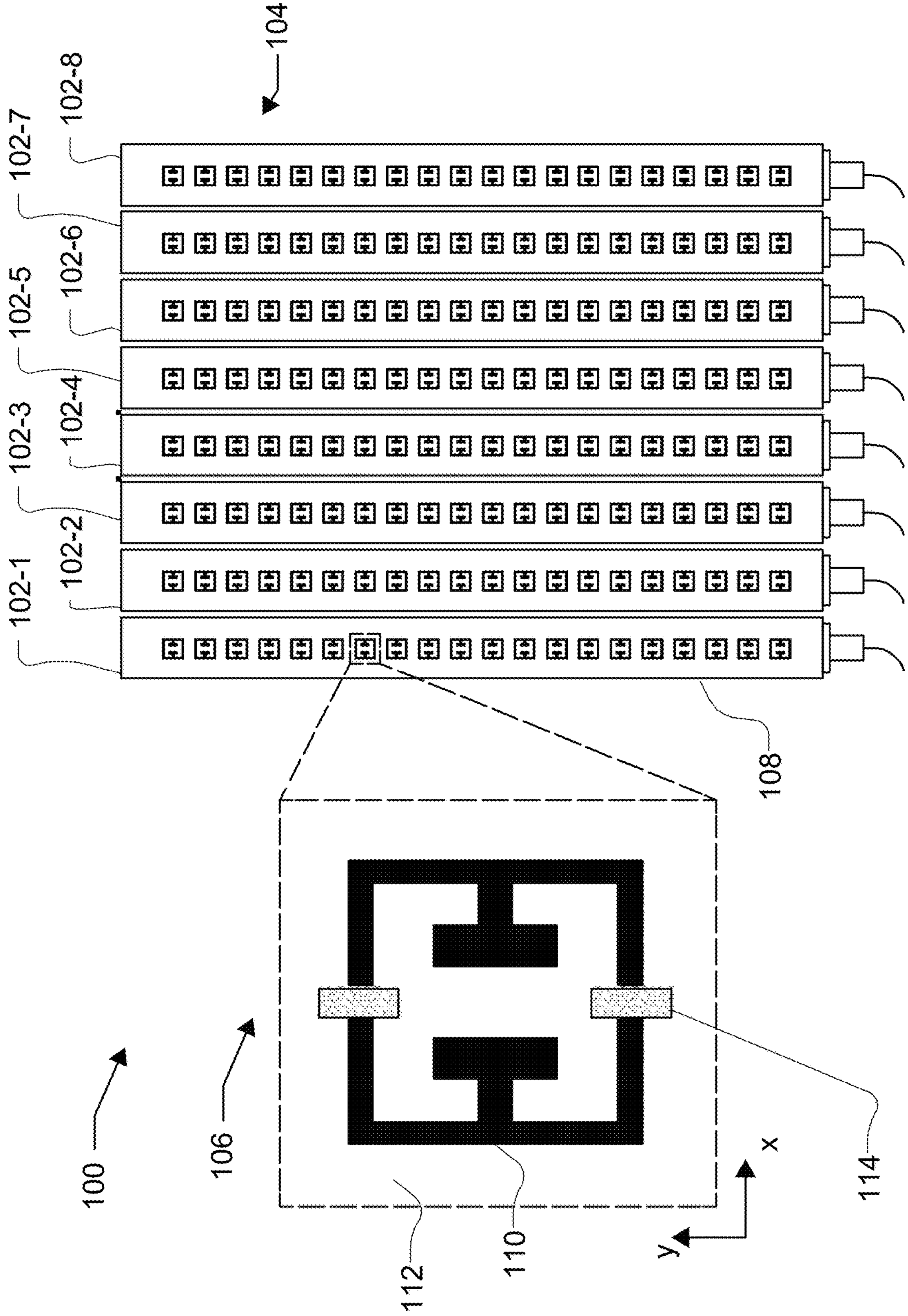
FIG. 1 illustrates an example metasurface antenna array system.

The subject disclosure describes improved systems and methods for suppressing grating lobes in traveling-wave antenna arrays. Specifically, the subject disclosure describes improved systems and methods for providing phase diverse input to traveling-wave antenna in a traveling-wave antenna array to suppress grating lobe formation. While certain applications are discussed in greater detail herein, such discussion is for purposes of explanation, not limitation.

Embodiments of the systems and methods described herein can be realized using artificially-structured materials. Generally speaking, the electromagnetic properties of artificially-structured materials derive from their structural configurations, rather than or in addition to their material composition.

In some embodiments, the artificially-structured materials are metamaterials. Some exemplary metamaterials are described in R. A. Hyde et al., "Variable metamaterial apparatus." U.S. patent application Ser. No. 11/355,493: D. Smith et al., "Metamaterials." International Application No. PCT/US2005/026052: D. Smith et al., "Metamaterials negative refractive index." Science 305,788 (2004); D. Smith et al., "Indefinite materials. U.S. patent application Ser. No. 10/525,191; C. Caloz, and T. Itoh, Electromagnetic Metamaterials. Transmission Line Theory and Microwave Applications, Wiley-Interscience, 2006; N. Engheta and R. W. Ziolkowski, eds., Metamaterials. Physics and Engineering Explorations, Wiley-Interscience, 2006; and A. K. Sarychev and V. M. Shalaev, Electrodynamics of Metamaterials, World Scientific, 2007; each of which is herein incorporated by reference.

Metamaterials generally feature subwavelength elements, i.e. structural elements with portions having electromagnetic length scales smaller than an operating wavelength of the metamaterial. In some metamaterials, the subwavelength elements may have a collective response to electromagnetic radiation that corresponds to an effective continuous medium response, characterized by an effective permittivity, an effective permeability, an effective magnetoelectric coefficient, or any combination thereof. For example, the electromagnetic radiation may induce charges and/or currents in the subwavelength elements, whereby the subwavelength elements acquire nonzero electric and/or magnetic dipole moments. Where the electric component of the electromagnetic radiation induces electric dipole moments, the metamaterial has an effective permittivity; where the magnetic component of the electromagnetic radiation induces magnetic dipole moments, the metamaterial has an effective permeability; and where the electric (magnetic) component induces magnetic (electric) dipole moments (as in a chiral metamaterial), the metamaterial has an effective magnetoelectric coefficient. Some metamaterials provide an artificial magnetic response; for example, split-ring resonators (SRRs)—or other LC or plasmonic resonators—built from nonmagnetic conductors can exhibit an effective magnetic permeability (c.f. J. B. Pendry et al, "Magnetism from conductors and enhanced nonlinear phenomena," IEEE Trans. Micro. Theo. Tech. 47, 2075 (1999), herein incorporated by reference). Some metamaterials have "hybrid" electromagnetic properties that emerge partially from structural characteristics of the metamaterial, and partially from intrinsic properties of the constituent materials. For example, G. Dewar, "A thin wire array and magnetic host structure with $n<0$," J. Appl. Phys. 97, 10Q101 (2005), herein incorporated by reference, describes a metamaterial consisting of a wire array (exhibiting a negative permeability as a consequence of its structure) embedded in a nonconducting ferrimagnetic host medium (exhibiting an intrinsic negative permeability). Metamaterials can be designed and fabricated to exhibit selected permittivities, permeabilities, and/or magnetoelectric coefficients that depend upon material properties of the constituent materials as well as shapes, chiralities, configurations, positions, orientations, and couplings between the subwavelength elements. The selected permittivites, permeabilities, and/or magnetoelectric coefficients can be positive or negative, complex (having loss or gain), anisotropic, variable in space (as in a gradient index lens), variable in time (e.g. in response to an external or feedback signal), variable in frequency (e.g. in the vicinity of a resonant frequency of the metamaterial), or any combination thereof. The selected electromagnetic properties can be provided at wavelengths that range from radio wavelengths to infrared/visible wavelengths; the latter wavelengths are attainable, e.g., with nanostructured materials such as nanorod pairs or nano-fishnet structures (c.f. S. Linden et al, "Photonic metamaterials: Magnetism at optical frequencies," IEEE J. Select. Top. Quant. Elect. 12, 1097 (2006) and V. Shalaev, "Optical negative-index metamaterials," Nature Photonics 1, 41 (2007), both herein incorporated by reference). An example of a three-dimensional metamaterial at optical frequencies, an elongated-split-ring "woodpile" structure, is described in M. S. Rill et al, "Photonic metamaterials by direct laser writing and silver chemical vapour deposition," Nature Materials advance online publication, May 11, 2008, (doi:10.1038/nmat2197).

While many exemplary metamaterials are described as including discrete elements, some implementations of metamaterials may include non-discrete elements or structures. For example, a metamaterial may include elements comprised of sub-elements, where the sub-elements are discrete structures (such as split-ring resonators, etc.), or the metamaterial may include elements that are inclusions, exclusions, layers, or other variations along some continuous structure (e.g. etchings on a substrate). Some examples of layered metamaterials include: a structure consisting of alternating doped/intrinsic semiconductor layers (cf. A. J. Hoffman, "Negative refraction in semiconductor metamaterials," Nature Materials 6, 946 (2007), herein incorporated by reference), and a structure consisting of alternating metal/dielectric layers (cf. A. Salandrino and N. Engheta, "Far-field subdiffraction optical microscopy using metamaterial crystals: Theory and simulations," Phys. Rev. B 74, 075103 (2006); and Z. Jacob et al, "Optical hyperlens: Far-field imaging beyond the diffraction limit," Opt. Exp. 14, 8247 (2006); each of which is herein incorporated by reference). The metamaterial may include extended structures having distributed electromagnetic responses (such as distributed inductive responses, distributed capacitive responses, and distributed inductive-capacitive responses). Examples include structures consisting of loaded and/or interconnected transmission lines (such as microstrips and striplines), artificial ground plane structures (such as artificial perfect magnetic conductor (PMC) surfaces and electromagnetic band gap (EGB) surfaces), and interconnected/extended nanostructures (nano-fishnets, elongated SRR woodpiles, etc.).

The artificially-structured materials, as described herein, can be arranged on either a surface of a waveguide or on a surface of a cavity. Specifically, the artificially-structured materials can be arranged on either a surface of a waveguide or on a surface of a cavity for purposes of transmitting and/or receiving energy according to the methods and systems described herein. For example, the artificially structured materials can include complementary metamaterial elements such as those presented in D. R. Smith et al, "Metamaterials for surfaces and waveguides," U.S. Patent Application Publication No. 2010/0156573, and A. Bily et al, "Surface scattering antennas," U.S. Patent Application Publication No. 2012/0194399, each of which is herein incorporated by reference. As another example, the artificially-structured materials can include patch elements such as those presented in A. Bily et al, "Surface scattering antenna improvements," U.S. patent application Ser. No. 13/838,934, which is herein incorporated by reference.

Further, the artificially-structured materials, as described herein, can form, at least in part, metamaterial surface antennas. Metamaterial surface antennas, also known as surface scattering antennas, are described, for example, in U.S. Patent Application Publication No. 2012/0194399 (hereinafter "Bily I"). Surface scattering antennas that include a waveguide coupled to a plurality of subwavelength patch elements are described in U.S. Patent Application Publication No. 2014/0266946 (hereinafter "Bily II"). Surface scattering antennas that include a waveguide coupled to adjustable scattering elements loaded with lumped/active devices are described in U.S. Application Publication No. 2015/0318618 (hereinafter "Chen I"). Surface scattering antennas that feature a curved surface are described in U.S. Patent Application Publication No. 2015/0318620 (hereinafter "Black I"). Surface scattering antennas that include a waveguide coupled to a plurality of adjustably-loaded slots are described in U.S. Patent Application Publication No. 2015/0380828 (hereinafter "Black II"). And various holographic modulation pattern approaches for surface scattering antennas are described in U.S. Patent Application Publication No. 2015/0372389 (hereinafter "Chen II"). All of these patent applications are herein incorporated by reference in their entirety.

Some of the infrastructure that can be used with embodiments disclosed herein is already available, such as general-purpose computers, computer programming tools and techniques, digital storage media, and communications networks. A computing device may include a processor such as a microprocessor, microcontroller, logic circuitry, or the like. The processor may include a special purpose processing device such as an ASIC, PAL, PLA, PLD, FPGA, or other customized or programmable device. The computing device may also include a computer-readable storage device such as non-volatile memory, static RAM, dynamic RAM, ROM, CD-ROM, disk, tape, magnetic, optical, flash memory, or other computer-readable storage medium.

Various aspects of certain embodiments may be implemented using hardware, software, firmware, or a combination thereof. As used herein, a software module or component may include any type of computer instruction or computer executable code located within or on a computer-readable storage medium. A software module may, for instance, comprise one or more physical or logical blocks of computer instructions, which may be organized as a routine, program, object, component, data structure, etc., that performs one or more tasks or implements particular abstract data types.

In certain embodiments, a particular software module may comprise disparate instructions stored in different locations of a computer-readable storage medium, which together implement the described functionality of the module. Indeed, a module may comprise a single instruction or many instructions, and may be distributed over several different code segments, among different programs, and across several computer-readable storage media. Some embodiments may be practiced in a distributed computing environment where tasks are performed by a remote processing device linked through a communications network.

The embodiments of the disclosure will be best understood by reference to the drawings, wherein like parts are designated by like numerals throughout. The components of the disclosed embodiments, as generally described and illustrated in the figures herein, could be arranged and designed in a wide variety of different configurations. Furthermore, the features, structures, and operations associated with one embodiment may be applicable to or combined with the features, structures, or operations described in conjunction with another embodiment. In other instances, well-known structures, materials, or operations are not shown or described in detail to avoid obscuring aspects of this disclosure.

Thus, the following detailed description of the embodiments of the systems and methods of the disclosure is not intended to limit the scope of the disclosure, as claimed, but is merely representative of possible embodiments. In addition, the steps of a method do not necessarily need to be executed in any specific order, or even sequentially, nor need the steps be executed only once.

FIG. 1 illustrates an example metasurface antenna array system 100. The metasurface antenna array system 100 includes a first metasurface antenna 102-1, a second metasurface antenna 102-2, a third metasurface antenna 102-3, a fourth metasurface antenna 102-4, a fifth metasurface antenna 102-5, a sixth metasurface antenna 102-6, a seventh metasurface antenna 102-7, and an eight metasurface antenna 102-8, collectively referred to as the plurality of metasurface antennas 102.

As discussed previously, metamaterial surface antennas, also referred to as metasurface antennas and waveguide-fed metasurface antennas, have been developed and integrated into wireless communication systems. The operating principle of metasurface antennas include that the waveguide is used to excite an array of metamaterial radiators coupled to the waveguide. Specifically, as the guided wave traverses the waveguide, each metamaterial element can transmit energy from the guided wave into free space as radiation. The radiation pattern of the aperture is then the superposition of the radiation from each of the elements. Introducing individually addressable tunable components within each metamaterial element facilitates electronic control over the radiation pattern. As a result, a directive beam can be formed and steered, as part of the achievable output waveforms. For applications requiring large reconfigurable antennas, 2D metasurface antenna arrays can be created by tiling several 1D waveguide-fed metasurfaces.

Metasurface antennas offer many advantage over other types of antennas. Specifically, metasurface antennas can derive several of their advantages by exchanging tuning range in favor of low-cost, passive tuning components. As metasurface antennas lack active phase shifters and amplifiers common to conventional beamsteering devices, a metasurface antenna can be tuned by shifting the resonance of each metamaterial element. Tuning metamaterial elements this way forgoes full control over the complex response, limiting the available phase states to $-180°<\phi<0$ and coupling the magnitude and phase response. As discussed previously, these constraints can lead to coarse effective element spacing due to a periodic magnitude profile, which causes grating lobes. Further, if each waveguide is excited with the same phase, grating lobes from each waveguide can constructively interfere, thereby magnifying their impact.

As discussed previously, grating lobes in metasurface antennas can be suppressed by using high dielectrics to decrease the wavelength of the guided wave and positioning the metamaterial elements in a dense spacing. However, this approach can introduce practical challenges in terms of element size and efficiency, In particular, in applications where hollow waveguides are preferred for their efficiency, such as in airborne and space systems, it becomes even more difficult to implement metasurface antennas according to this approach.

Returning back to the example metasurface antenna array system 100 shown in FIG. 1, the plurality of metasurface antennas 102 are positioned in an adjacent manner to form an array of metasurface antennas 104. Each of the metasurface antennas 102 is a 1D antenna. Accordingly, an electrically large 2D antenna can be formed by combining the metasurface antennas 102 to form the array of metasurface antennas 104.

Each metasurface antenna of the plurality of metasurface antennas 102 is formed by a plurality of metamaterial elements, e.g. metamaterial element 106, patterned on a side of a waveguide 108. The example metamaterial element 106 includes a metamaterial component 110 formed in a surrounding conductor 112. The surrounding conductor 112 can be formed as part of the waveguide 108 of the first metasurface antenna 102-1. The metamaterial element 106 also includes a tunable component 114. The tunable component 114 can include an applicable component having characteristics that can be adjusted to change properties, e.g. the resonance frequency, of the metamaterial element 106 itself. For example, the tunable component 114 can include a varactor diode. In turn, the tunable component 114 can be tuned over a spectral bandwidth to generate a desired radiation pattern.

The disclosure now continues with a discussion of analyzing the metasurface antenna array system 100 to illustrate the existence of grating lobes during operation of the metasurface antenna array system 100. In analyzing the metasurface antenna array system 100, the metamaterial elements forming the metasurface antenna array system 100 can be analyzed. Specifically, the metasurface antenna array system 100 can be analyzed under the assumption that the metamaterial elements are weakly coupled. As a result, the inter-element coupling between the metamaterial elements within the metasurface antenna array system 100 can be ignored.

The simplified model used here facilitates an array factor analysis that provides sufficient insight into the grating lobe problem associated with metasurface antennas, which would be present in both weakly coupled and strongly coupled metasurface antennas. Each metamaterial element in the metasurface antenna array system 100 can be modeled as a point dipole with a response dictated by the incident magnetic field and the element's complex polarizability. In particular, while polarizability is a tensor quantity, it can be assumed that the metamaterial elements are only polarizable in the x direction and can thus be approximated with a scalar.

Equation 1 shows a representation of the dipole moment of each metamaterial element.

$$\eta_n = H_n \alpha_n \quad \text{Equation 1}$$

In Equation 1, $\eta_n$ is the dipole moment of the $n^{th}$ element, $\alpha_n$ is the polarizability, and $H_n$ is the magnetic field that is described by Equation 2.

$$H_n = H_0 e^{-j\beta_n} \quad \text{Equation 2}$$

In Equation 2, $\beta$ is the waveguide constant and $y_n$ is the position measured from an origin.

In analyzing the metasurface antenna array system 100, each of the metamaterial elements is modeled as having an analytic, Lorentzian probability, as shown in Equation 3.

$$\alpha = \frac{F\omega^2}{\omega_0^2 - w^2 + j\omega\Gamma} \quad \text{Equation 3}$$

In Equation 3, F is the oscillator strength, $\omega$ is the angular frequency, $\omega_0$ is the resonant frequency, and $\Gamma$ is the loss term. F can be set to 1 and $\Gamma$ can be set to $7.2\times10^8$ rad/s. Tuning an element can be accomplished by changing $\omega_0$, which leads to shifts in the magnitude and the phase of the polarizability. The polarizability can be expressed by the relationship shown in Equation 4.

$$|\alpha| = \frac{F\omega}{\Gamma}|\cos\psi| \quad \text{Equation 4}$$

In Equation 4, $\psi$ denotes the phase advance that is introduced by the modeled metamaterial element.

Figure 2A:
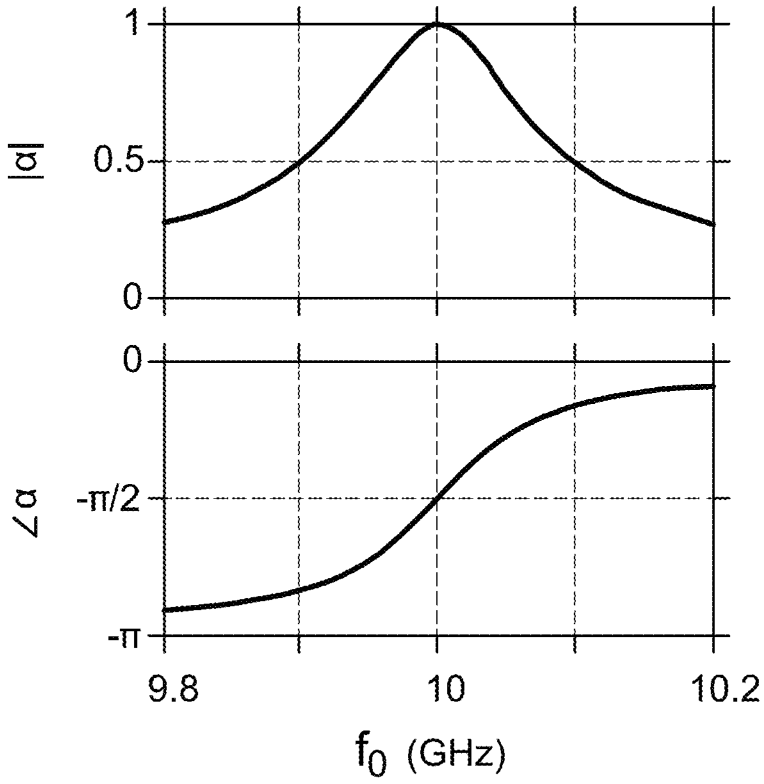
FIG. 2A shows the response and the normalized Lorentzian response of a metamaterial element.
Figure 2B:
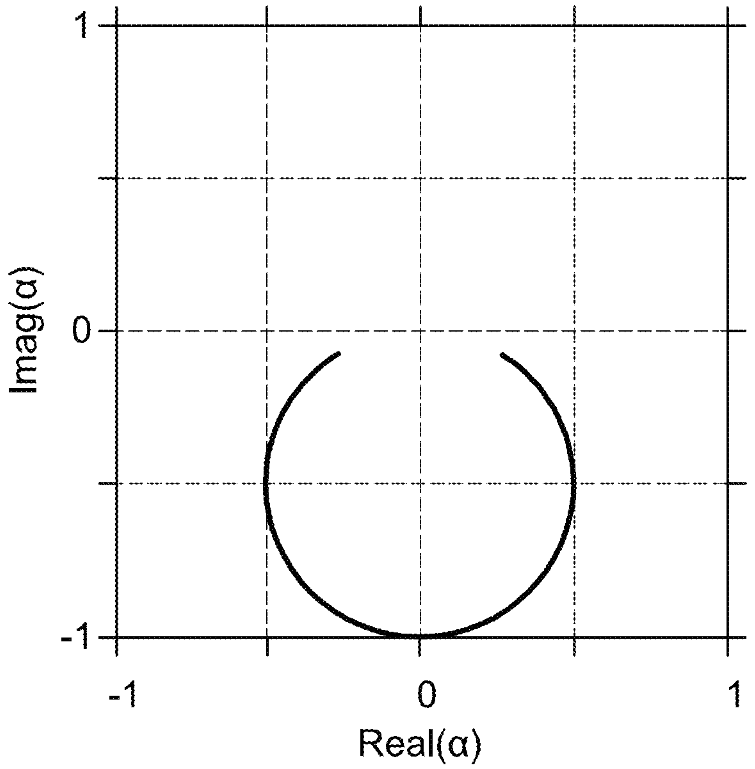
FIG. 2B shows the complex Lorentzian response of the metamaterial element.

FIG. 2A shows the response and the normalized Lorentzian response of a metamaterial element. FIG. 2B shows the complex Lorentzian response of the metamaterial element. As expressed in Equation 4 and as shown in FIGS. 2A and 2B the Lorentzian response has a range of phase advance that is within $-180°<\phi<0°$, which is less than half of the control range of active phase shifters. Further, the magnitude varies over this phase range, falling to zero at either extreme of the phase range thereby limiting the actual useful phase range. The phase range can be increased by spacing the metamaterial elements at $\lambda/4$ or denser, where $\lambda$ is the free space wavelength. Further, the phase accumulation of the guided wave associated can help regain some of the reduced element control. However such approaches can be costly and challenging to implement, especially at higher frequencies or with larger apertures. Further and absent such approaches, the strong magnitude modulation of the weights for the metamaterial elements will produce grating lobes. In particular, grating lobes are produced when the metamaterial elements are modulated to produce a desired phase distribution that is associated with beamforming.

To further illustrate the grating lob problem, radiation patterns for a metasurface antenna array are calculated according to Equation 5 with array factor calculation that have the dipole moments from Equation 1 as the antenna weights.

$$AF(\theta,\varphi) = \cos\theta \sum_{n=1}^{N}\sum_{m=1}^{M} \eta_{n,m} e^{-jk(x_m \sin\theta \sin\psi + y_n \sin\theta \cos\varphi)} \quad \text{Equation 5}$$

In Equation 5, k is the free space wavenumber, $y_n$ is the position of element n along the y direction, N is the total number of elements in the y direction, $x_m$ is the position of element m along the x direction, M is the total number of elements in the x direction, θ is the elevation angle, and ϕ is the azimuth angle. Further, since the elements radiate as dioples, the individual element's radiation patterns can be included with the array factor calculation as the cos θ. The dominant term of the radiated field, E, from the array factor calculations is $E_y$.

Ideally, the polarizability of each element can be set to counteract the phase of the guided wave and form a beam steered to ($\theta_s$, $\phi_s$) according to Equation 6.

$$\alpha_n = e^{j(\beta y_n + kx_m \sin\theta_s + ky_n \sin\theta_s \cos\varphi_s)} \quad \text{Equation 6}$$

However, as a result of the Lorentzian-constrained nature of the metamaterial elements, the polarizability profile given by Equation 6 is difficult to fully realize. Lorentzian-constrained modulation (LCM) can be used to optimize the phase and magnitude of each metamaterial element in order to approximate Equation 6, as is shown in Equation 7.

$$\alpha_n = \frac{-j + e^{j(\beta y_n + kx_m \sin\theta_s \sin\varphi_s + ky_n \sin\theta_s \cos\varphi_s)}}{2} \quad \text{Equation 7}$$

Equation 7 can be added to Equation 5, such that the array factor is expressed as shown below in Equation 8.

$$AF(\theta, \varphi) = \frac{H_0 \cos\theta}{2}\left[\sum_{n=1}^{N}\sum_{m=1}^{M} -je^{-j(\beta y_n + ky_n \sin\theta\cos\varphi + kx_m \sin\theta\sin\varphi)} + \sum_{n=1}^{N}\sum_{m=1}^{M} e^{-jk(y_n(\sin\theta\cos\varphi - \sin\theta_s\cos\varphi_s) + x_m(\sin\theta\sin\varphi - \sin\theta_s\sin\varphi_s))}\right] \quad \text{Equation 8}$$

With the constrained Lorentzian scheme for choosing the polarizabilities, the radiation pattern can consist of the main beam and potentially only one diffracted order.

Array factor calculations can be used to model the beamforming performance of the example metasurface antenna array system 100 shown in FIG. 1. Specifically, the corresponding waveguide of each of the metasurface antennas 102 has a width $\alpha_r$=2.0 cm, which corresponds with β=138.7 $m^{-1}$. Each of the metasurface antennas 102 is fed with input at the same phase and operates at 10 GHz. Each of the metamaterial elements are spaced at 0.5 cm (λ/6) within each of the metasurface antennas 102. The metamaterial elements can be modeled according to Equation 3 with a resonant frequency that is tunable from 9.8 to 10.2 GHz.

Figure 3A:
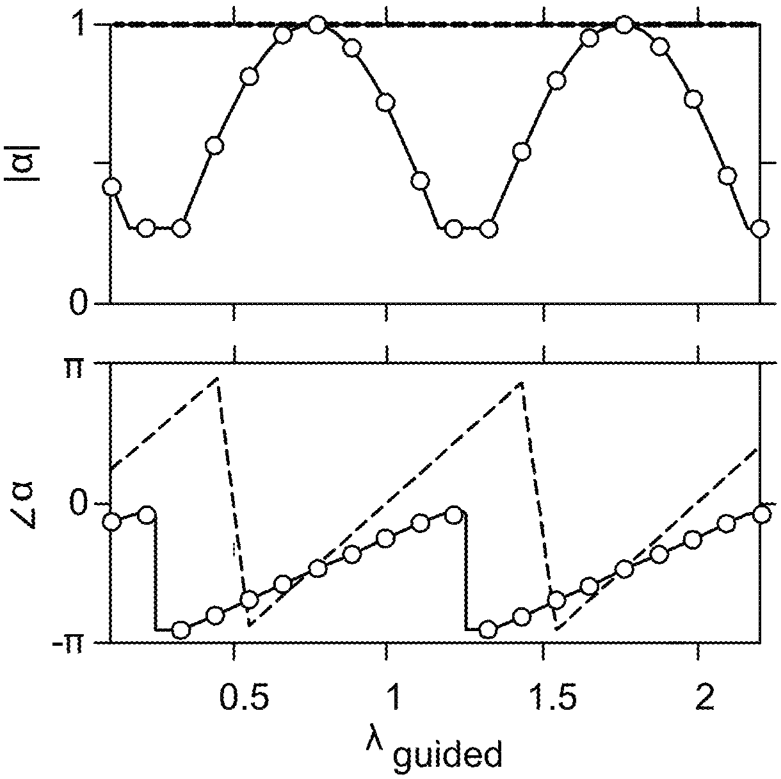
FIG. 3A shows a simulated polarizability of a metasurface antenna in the example metasurface antenna array system based on the ideal polarizability and the Lorentzian-constrained modulation polarizability.
Figure 3B:
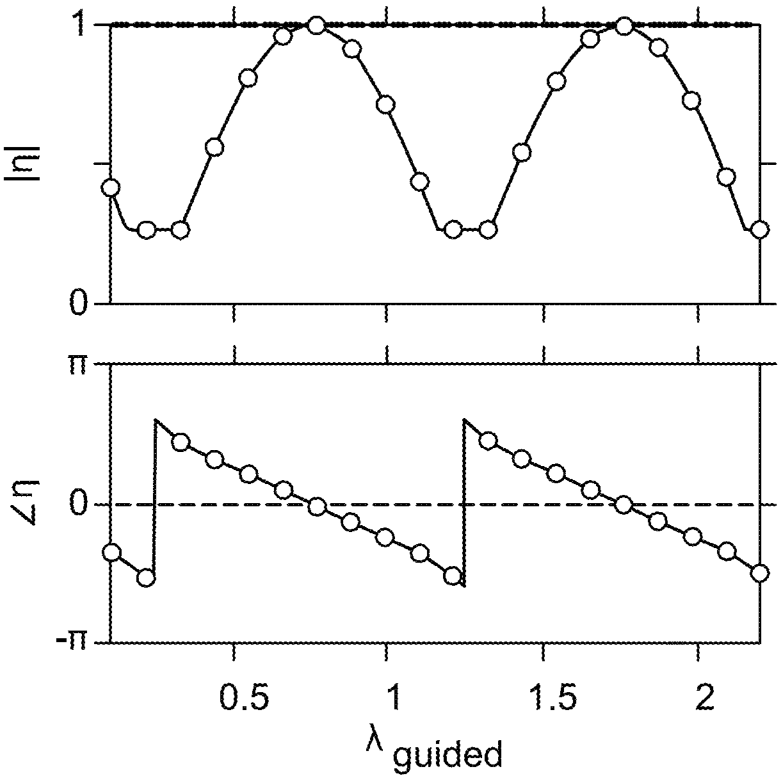
FIG. 3B shows simulated dipole moments of the metasurface antenna in the example metasurface antenna array system based on the ideal polarizability and the Lorentzian-constrained modulation polarizability.
Figure 4A:
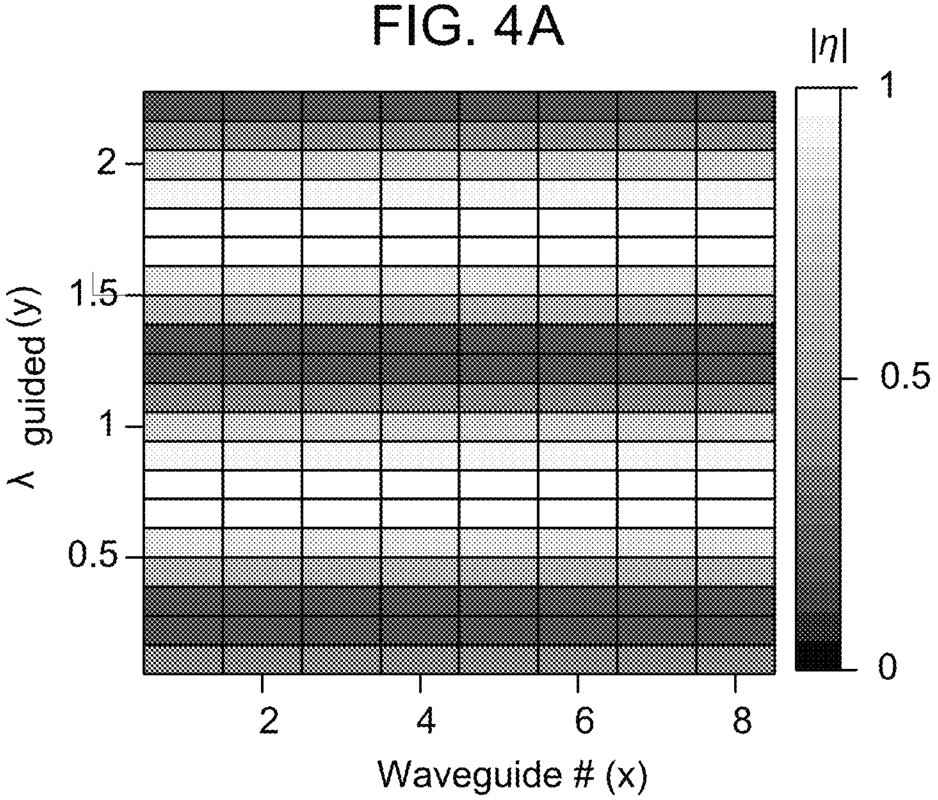
FIG. 4A shows the dipole moments for the metamaterial elements in the corresponding metasurface antennas represented in FIGS. 3A and 3B.
Figure 4B:
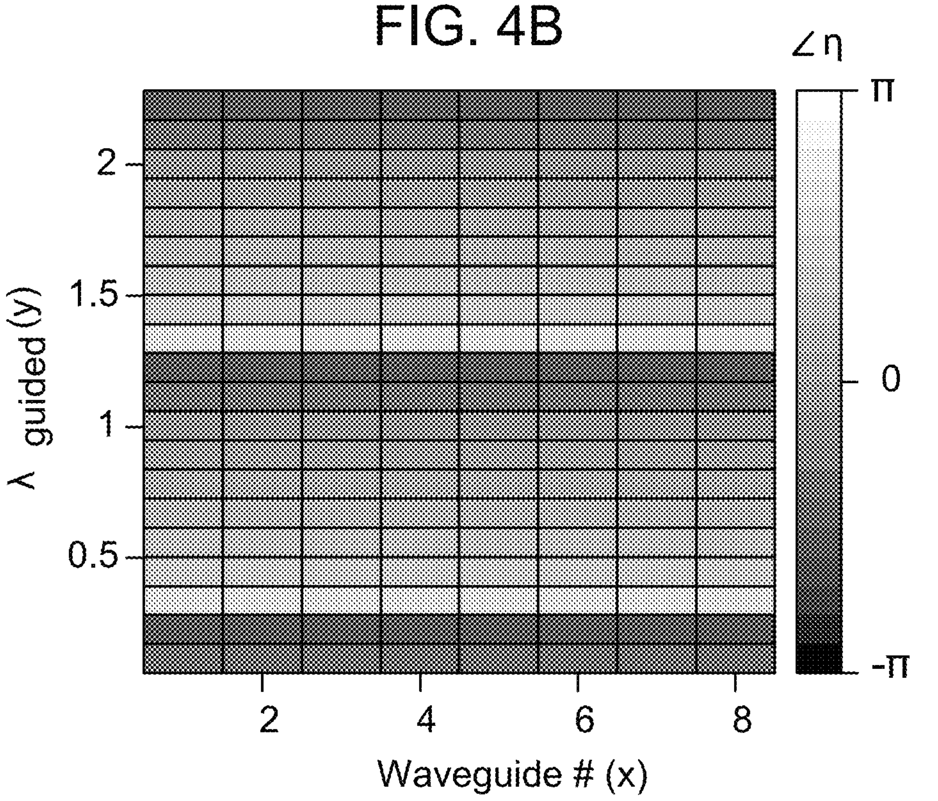
FIG. 4B shows the dipole moments for the metamaterial elements in the corresponding metasurface antennas represented in FIGS. 3A and 3B.

When the array factor described in Equation 8 is applied, a broadside beam can be generated with the example metasurface antenna array system 100. FIG. 3A shows a simulated polarizability of a metasurface antenna in the example metasurface antenna array system 100 based on the ideal polarizability and the Lorentzian-constrained modulation polarizability. FIG. 3B shows simulated dipole moments of the metasurface antenna in the example metasurface antenna array system 100 based on the ideal polarizability and the Lorentzian-constrained modulation polarizability. Specifically, in FIGS. 3A and 3B, the dashed line shows the desired response, according to Equation 6, the solid line shows the realized response, according to Equation 7, and the dots represent the locations of the metamaterial elements in the metasurface antenna. As shown in FIGS. 3A and 3B a periodic modulation of the magnitude is apparent rather than the ideally flat profile. This is further illustrated in FIG. 4A, which shows the dipole moments for the metamaterial elements in the corresponding metasurface antennas represented in FIGS. 3A and 3B. FIG. 4B also shows the dipole moments for the metamaterial elements in the corresponding metasurface antennas represented in FIGS. 3A and 3B.

Figure 5A:
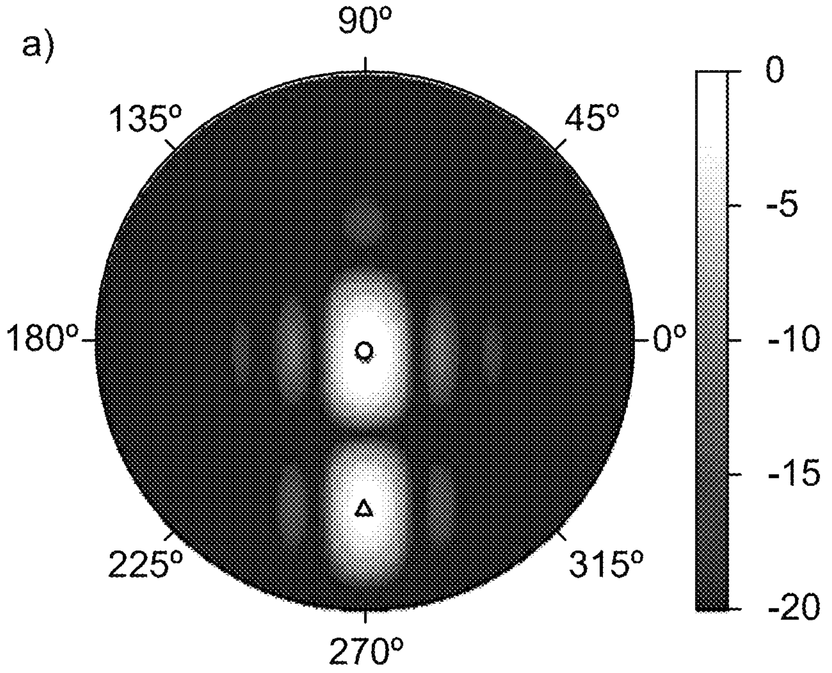
FIG. 5A shows a normalized farfield pattern of the resultant broadside beam.
Figure 5B:
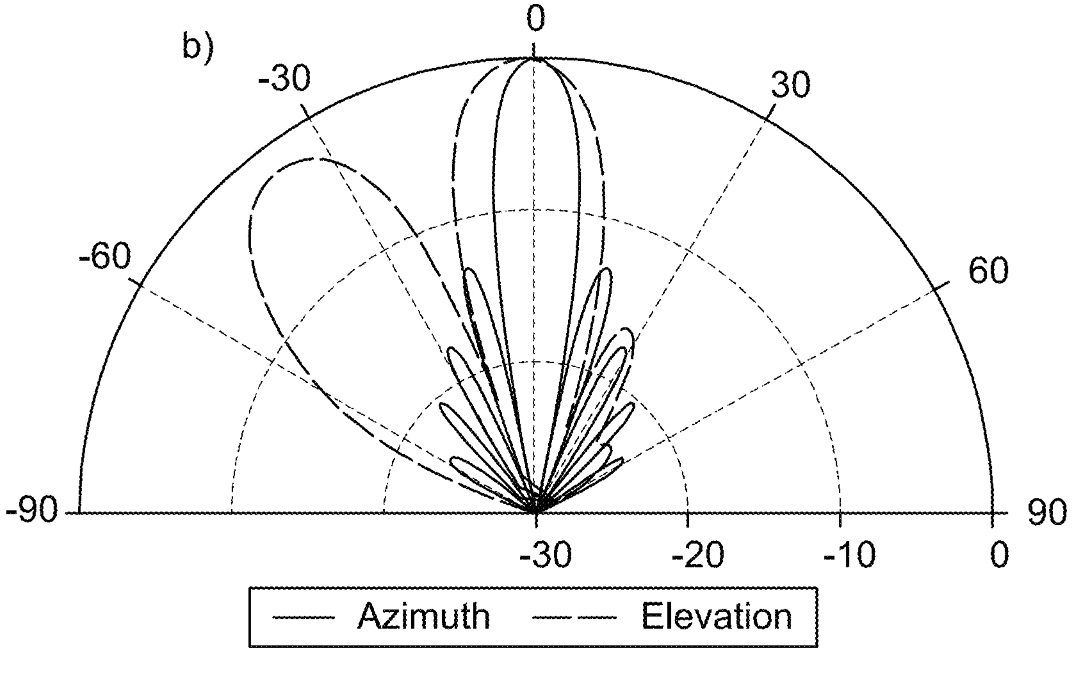
FIG. 5B shows the beam pattern of the resultant broadside beam.
Figure 6A:
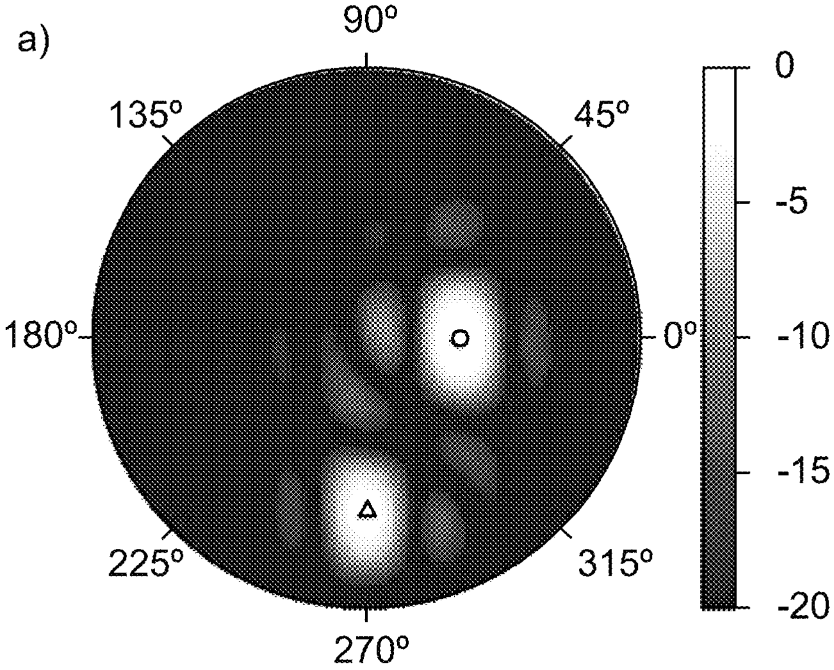
FIG. 6A shows a normalized farfield pattern created through the example metasurface antenna array system and steered to 20° in azimuth.
Figure 6B:
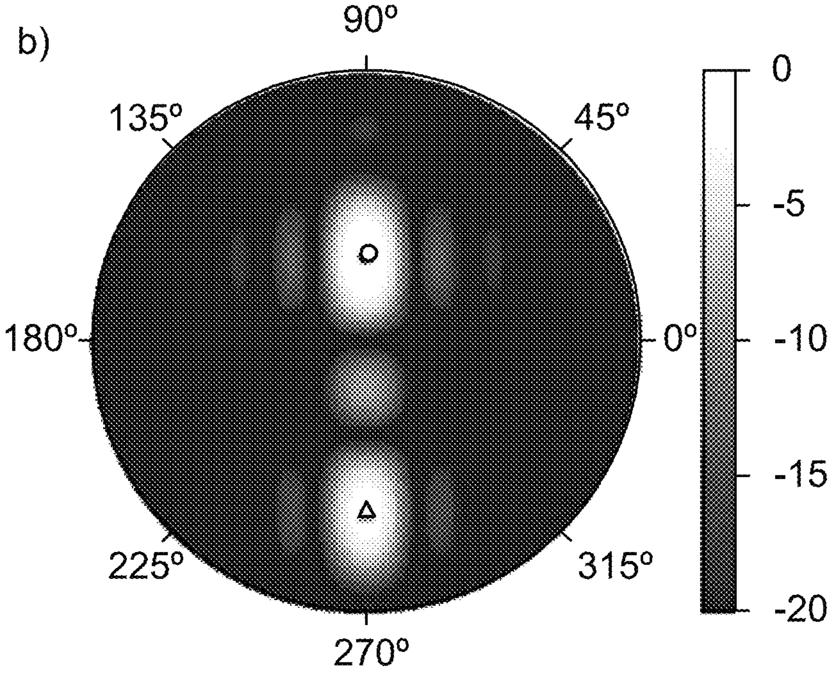
FIG. 6B shows a normalized farfield pattern created through the example metasurface antenna array system and steered to 20° in elevation.

FIG. 5A shows a normalized farfield pattern of the resultant broadside beam. FIG. 5B shows the beam pattern of the resultant broadside beam. As is shown in FIGS. 5A and 5B a strong grating lobe is present in the elevation direction. This grating lobe is marked with a triangle in FIG. 5A. This grating lobe remains present when the beam is steered to 20° in either azimuth or elevation. Specifically, FIG. 6A shows a normalized farfield pattern created through the example metasurface antenna array system 100 and steered to 20° in azimuth. FIG. 6B shows a normalized farfield pattern created through the example metasurface antenna array system 100 and steered to 20° in elevation.

To further illustrate the source of the grating lobes, the grating lobe term can be isolated from the array factor. Specifically, in Equation 8, the second term is the beam-steering term, in which the phase of the guided wave can be counteracted and the steering phase term has been applied. Further, in Equation 8, the first term shows the grating lobe term and the grating lobe exists along the ϕ=0 direction. Accordingly, the first term in Equation 8 can be represented as $\Sigma_{n=1}^{N} e^{-j\gamma_n(\beta - k \sin\theta)}$.

Thus, the grating lobe can appear at $\theta_g$=arcsin(−β/k), $\varphi_g$=0°. As follows, a grating lobe can be simulated at −41°.

As discussed previously, grating lobes can degrade performance of antenna systems, such as the example metasurface antenna array system shown in FIG. 1. Further, while this discussion has focused on metamaterial-based antennas, grating lobes are also issues in other traveling-wave antennas. Therefore, the systems and methods described herein can be applied in implementations that integrate applicable traveling-wave antenna arrays.

The present includes systems and methods for solving the previously described problems/discrepancies associated with grating lobe formation. Specifically, the present includes systems and methods for suppressing grating lobe formation in traveling-wave antenna arrays. More specifically, the present includes systems and methods for suppressing grating lobe formation through the introduction of phase diverse input to traveling-wave antenna arrays.

Figure 7:
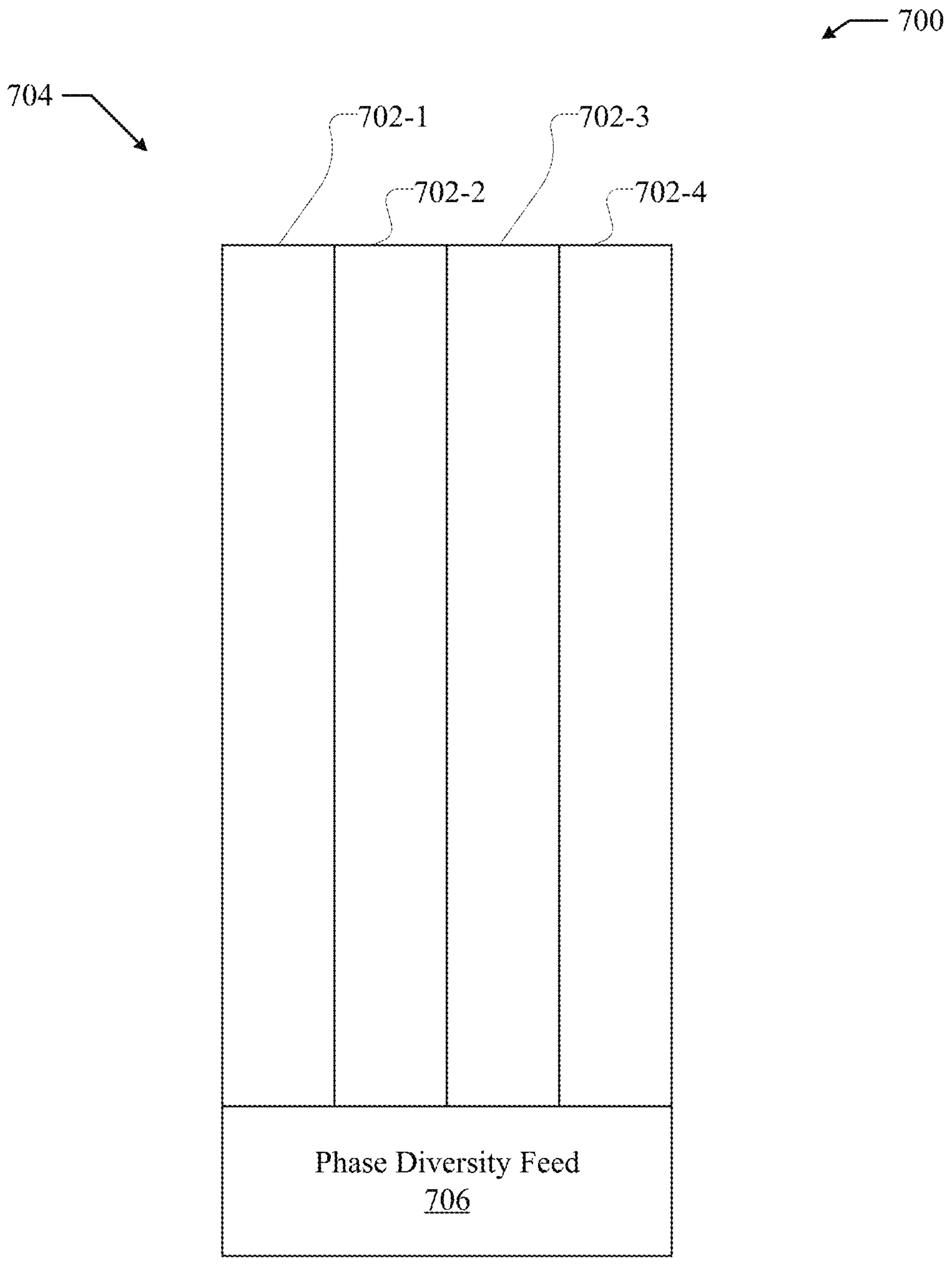
FIG. 7 is an example antenna system configured to provide phase diverse input to an antenna array.

FIG. 7 is an example antenna system 700 configured to provide phase diverse input to an antenna array. The antenna system 700 includes a first traveling-wave antenna 702-1, a second traveling-wave antenna 702-2, a third traveling-wave antenna 702-3, and a fourth traveling-wave antenna 702-4, collectively referred to as the traveling-wave antennas 702. The traveling-wave antennas 702 are adjacent to each other and combine to a form a traveling-wave antenna array 704. Each of the traveling-wave antennas 702 can be a one-dimensional antenna. As follows, the traveling-wave antenna array can function as a two-dimensional antenna array. While the antenna system 700 is shown as having four traveling-wave antennas, the antenna system 700 can include more or fewer adjacent traveling-wave antennas, as long as there are a plurality of adjacent traveling-wave antennas.

The traveling-wave antennas 702 can be an applicable type of antenna that uses a traveling-wave through a guiding structure to radiate energy. Specifically, each of the traveling-wave antennas 702 can use energy that travels through the antennas 702 in one direction to radiate energy from the antennas 702. Specifically, each of the traveling-wave antennas 702 can be formed from a waveguide that is used to radiate energy into free space. Accordingly, the waveguides forming the traveling-wave antennas 702 can be referred to radiating waveguides, as used herein. For example, the traveling-wave antennas 702 can include applicable metamaterial radiating waveguide antennas, such as those discussed with respect to the metasurface antenna array system 100. In another example, the traveling-wave antennas 702 are leaky wave antennas.

The antenna system 700 also includes a phase diversity feed 706 coupled to the traveling-wave antenna array 704. The phase diversity feed 706 is configured to provide phase diverse input to at least two of the traveling-wave antennas 702 in the traveling-wave antenna array 704. Phase diversity, as used herein, includes that input provided to one or more antennas in a traveling-wave antenna array has a different phase from input provided to one or more other antennas in the array. For example, the phase diversity feed 706 can provide input to the first traveling-wave antenna 702-1 that is offset by 180° from input that the phase diversity feed 706 provides the third traveling-wave antenna 702-3. Input, as used herein, includes applicable input used in radiating energy from traveling-wave antennas in a traveling-wave antenna array. Specifically, input can include energy waves that are guided through traveling-wave antennas along a single direction for radiating energy from the traveling-wave antennas.

Subsequently, the antenna system 700 can be operated with the phase diverse input that is provided to the traveling-wave antenna array 704. Specifically, the traveling-wave antenna array 704 can function to radiate energy using the phase diverse input. Operating the antenna system 700 using phase diverse input can facilitate grating lobe suppression or elimination in an output beam pattern of the antenna system 700. Specifically and as will be discussed in greater detail later, the phase diverse input can cause the individual output of at least some of the traveling-wave antennas to interfere, such that grating lobes are suppressed or eliminated in an output beam pattern.

The phase diversity feed 706 can be an applicable feed for providing phase diverse input to traveling-wave antennas in a traveling-wave antenna array 704. Specifically, the phase diversity feed 706 can be comprised of a plurality of passive phase shifters, e.g. forming an array of passive phase shifters, that are configured to provide input at different phases to two or more of the traveling-wave antennas 702. For example, each of the traveling-wave antennas in the traveling-wave antenna array 704 can have its own corresponding passive phase shifter. As follows, two or more of the passive phase shifters can provide phase diverse input to two or more of the traveling-wave antennas that correspond to the two or more passive phase shifters. For example, a passive phase shifter coupled to the first traveling-wave antenna array 702-1 can provide input to the first traveling-wave antenna 702-1 that is phase shifted with respect to input providing to the third traveling-wave antenna 702-3.

The phase diversity feed 706, as will be discussed in greater detail later, can include a feed waveguide. The feed waveguide is coupled to each of the traveling-wave antennas 702 through one or more applicable coupling mechanism that facilitate guiding of feed waves from the feed waveguide and into the traveling-wave antennas 702 as phase diverse input. Specifically, the feed waveguide can be coupled to the traveling-wave antenna array 704 through corresponding apertures for each of the traveling-wave antennas 702. As follows, the feed waveguide can provide phase divers input to two or more traveling-wave antennas in the traveling-wave antenna array 704 through the corresponding apertures for the two or more traveling-wave antennas. The feed waveguide is distinct from the radiating waveguides forming the traveling-wave antennas 702 based on the output of feed waveguide. Specifically, while the radiating waveguides can output energy into free space, the feed waveguide can output energy to other waveguides, e.g. the radiating waveguides.

The phase diverse input provided to the two or more traveling-wave antennas of the traveling-wave antenna array 704 can include input that is diverse by a specific amount. For example, the phase diverse input can include 180°, 90°, or 45° phase offset between the input provided to the two or more traveling-wave antennas. Further, the phase diverse input provided to the two or more traveling-wave antennas of the traveling-wave antenna array 704 can include input that is randomly or pseudo-randomly made diverse. For example, one or more phase offsets between the inputs provided to the two or more traveling-wave antennas can be randomly or pseudo-randomly selected.

Further, either or both the input and the phase diverse input that is applied through the phase diversity feed 706 can be specifically selected for the antenna system 700. More specifically, the input and/or the phase diverse input can be selected based on one or more characteristics of the traveling-wave antenna array 704. Characteristics of the traveling-wave antenna array 704 can include applicable features of the antenna array 704 including both features related the design and operation of the antenna array 704. For example, either or both the input and the phase diverse input that is applied through the phase diversity feed 706 can be selected based on the number of traveling-wave antenna array 704. Further, either or both the input and the phase diverse input that is applied through the phase diversity feed 706 can be selected based on one or more desired output radiation patterns, e.g. desired output beam patterns.

Figure 8:
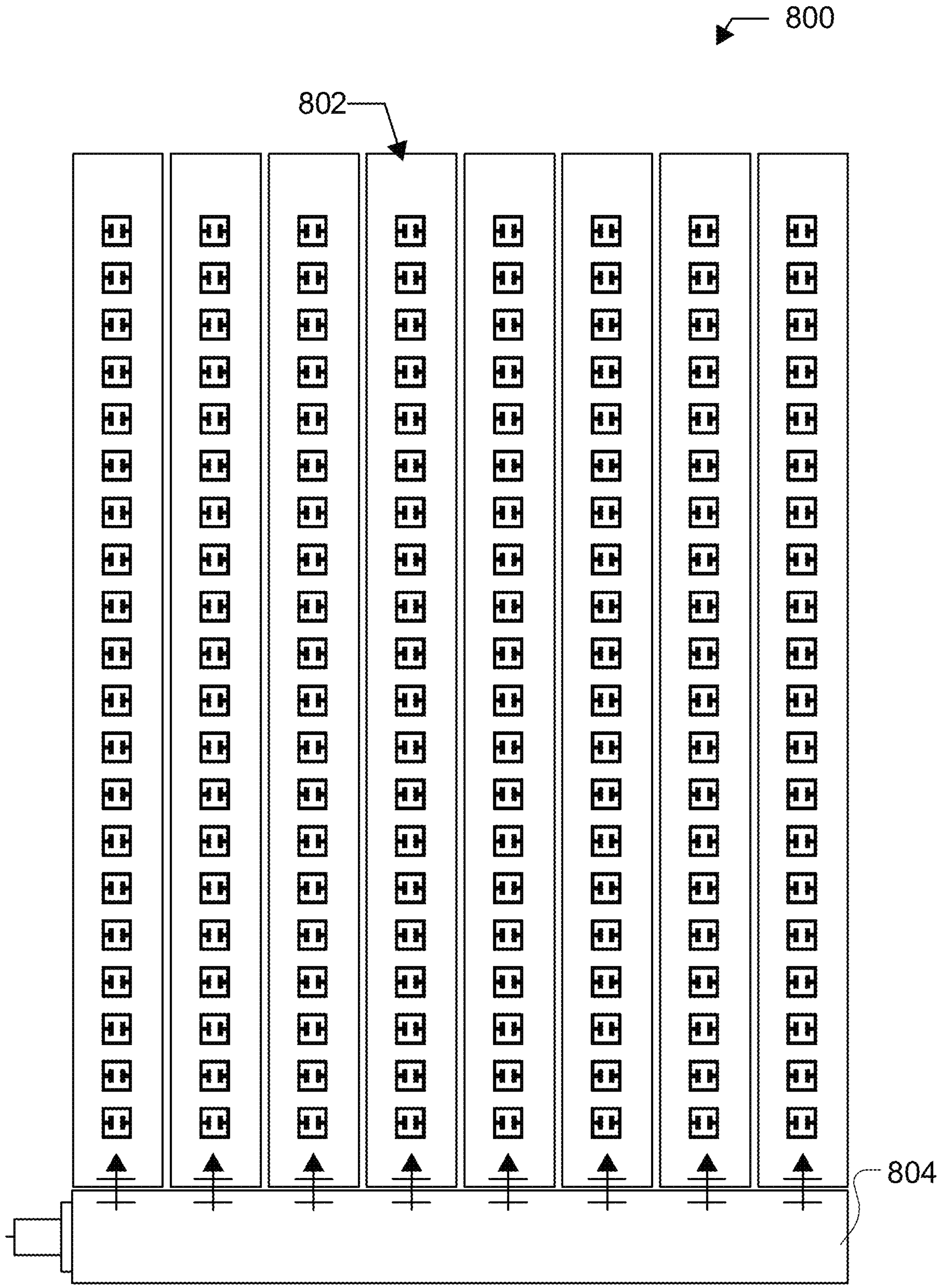
FIG. 8 is another example antenna system configured to provide phase diverse input to an antenna array.

FIG. 8 is another example antenna system 800 configured to provide phase diverse input to an antenna array. The antenna system 800 includes an array of metasurface antennas 802 and a waveguide feed 804. The waveguide feed 804 is configured to provide diverse phase input to two or more metasurface antennas in the array of metasurface antennas 802.

Specifically and to illustrate the grating lobe suppression that is achievable by feeding the antenna system 800 with phase diverse input, Equation 2 can be updated to include an arbitrary phase term, as shown in Equation 9.

$$H_{n,m}=H_0 e^{-j\beta y_n+j\gamma_m} \qquad \text{Equation 9}$$

In Equation 9, $\gamma_m$ is the phase applied to the feed of the $m^{th}$ waveguide in the metasurface antenna array 802. As follows the polarizability, e.g. optimal polarizability, as determined by LCM, is shown in Equation 10

$$\alpha_{n,m}=\frac{-j+e^{j}(\beta y_n+kx_m sin\theta_s sin\varphi_s+ky_n sin\theta_s cos\varphi_s-\gamma_m)}{2} \qquad \text{Equation 10}$$

When Equation 5 and Equation 10 are combined, the array factor can be represented as shown below in Equation 11.

$$AF(\theta,\varphi)= \qquad \text{Equation 11}$$

-continued $$\frac{H_0\cos\theta}{2}\left[-j\sum_{n=1}^{N}\sum_{m=1}^{M}e^{-j\gamma_n(\beta+k\sin\theta\cos\varphi)}e^{-j(kx_m\sin\theta\sin\varphi-\gamma_m)}+\sum_{n=1}^{N}\sum_{m=1}^{M}e^{-jky_n(\sin\theta\cos\varphi-\sin\theta_s\cos\varphi_s)}e^{-jkx_m(\sin\theta\sin\varphi-\sin\theta_s\sin\varphi_s)}\right]$$

In Equation 11, M is the number of waveguides and corresponding antennas in the metasurface antenna array 802. Equation 11 can be separated into two terms. The first term is the grating lobe term. The second term is the beamsteering term. The grating lobe term can be separated into the multiplication of two summations as $$\frac{-H_0 j\cos\theta}{2}\sum\nolimits_{n=1}^{N}e^{-j\gamma_n(\beta+k\sin\theta\cos\varphi)}\sum\nolimits_{m=1}^{M}e^{-j(kx_m\sin\theta\sin\varphi-\gamma_m)}.$$

From FIGS. 5A, 5B, 6A, and 6B, the grating lobe from the metasurface behavior occurs along the θ direction in the ϕ=0 plane. To analyze the grating lobes more explicitly, ϕ=0 can be substituted into the previously described multiplication of two summations to yield $$\frac{-H_0 j\cos\theta}{2}\sum\nolimits_{n=1}^{N}e^{-j\gamma_n(\beta+k\sin\theta)}\sum\nolimits_{M=1}^{M}e^{j\gamma_m}.$$

In order to cancel the grating lobe term, the summation of $e^{j\gamma_m}$ from m=1 to M should equal 0. Therefore, in order to cancel the grating lobe, $\gamma_m$ is selected as $\gamma_m=\pm m(2\pi/M)$, such that $e^{j\gamma_m}$ is space in the complex plane. Therefore, feeding metasurface antennas in the metasurface antenna array 802 can suppress or otherwise eliminate grating lobes in an output beam pattern of the metasurface antenna array 802.

Waveguide feed layers, such as the waveguide feed 804 in the example antenna system 800, are advantageous in that they offer both a small form factor and low loss. To suppress the grating lobes, the phase accumulation of the waveguide feed 804 can match a specific $\gamma_m$ as shown in Equation 12.

$$e^{j\gamma_m}=e^{-jm\frac{2\pi}{M}}=e^{-j\beta_f x_m}\qquad\text{Equation 12}$$

In Equation 12, $\beta_f$ is the propagation constant of the waveguide feed 804 and $x_m$ is the position along the feed waveguide 804. The waveguide feed 804 sampling the radiating waveguide at a spacing equal to the radiating waveguide width $a_r$ can be mathematically represented according to Equation 13.

$$\beta_f a_r=2\pi/M\qquad\text{Equation 13}$$

Equation 13 is equivalent to Equation 14, which is shown below.

$$a_r\sqrt{\epsilon_0\mu_0\omega^2-\frac{\pi^2}{a_f^2}}=\frac{2\pi}{M}\qquad\text{Equation 14}$$

In Equation 14, of is the width of the waveguide feed 804. Accordingly, if the condition shown below in Equation 15 is satisfied, the waveguide feed 804 can provide a phase to two or more radiating waveguides of the metasurface antennas in the array of metasurface antennas 802 that cancel or otherwise suppress the grating lobe(s) according to Equation 15.

$$a_f=\frac{Ma_r\lambda}{2\sqrt{M^2a_r^2-\lambda^2}}\qquad\text{Equation 15}$$

Figure 9A:
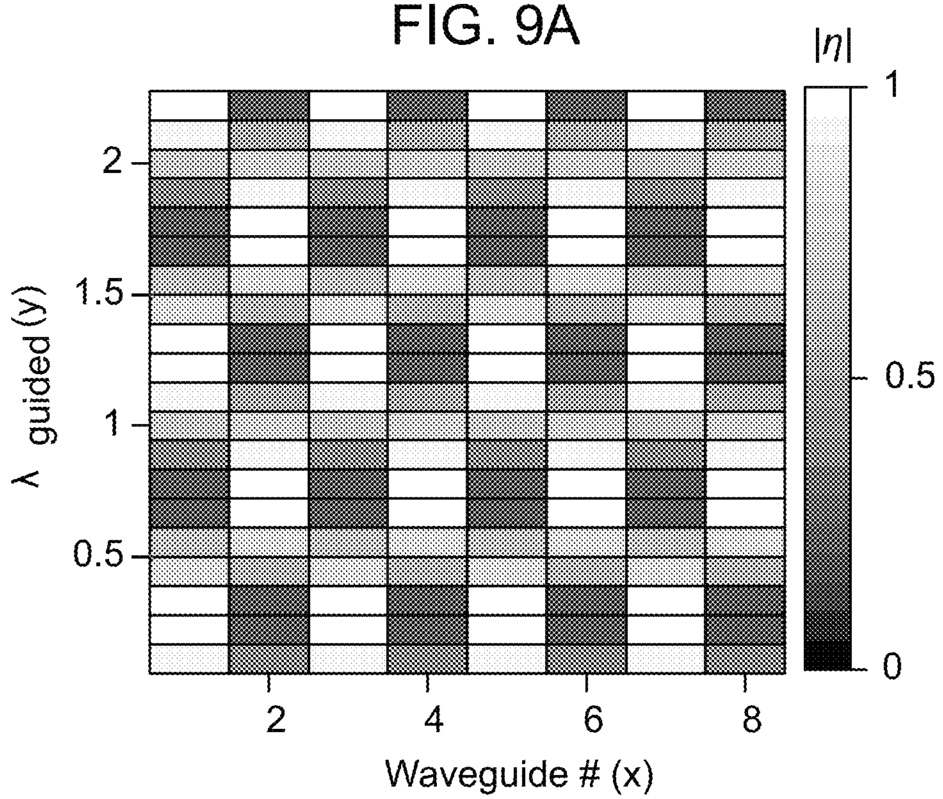
FIG. 9A shows the dipole moments for the metamaterial elements in the corresponding metasurface antennas in the example antenna system.
Figure 9B:
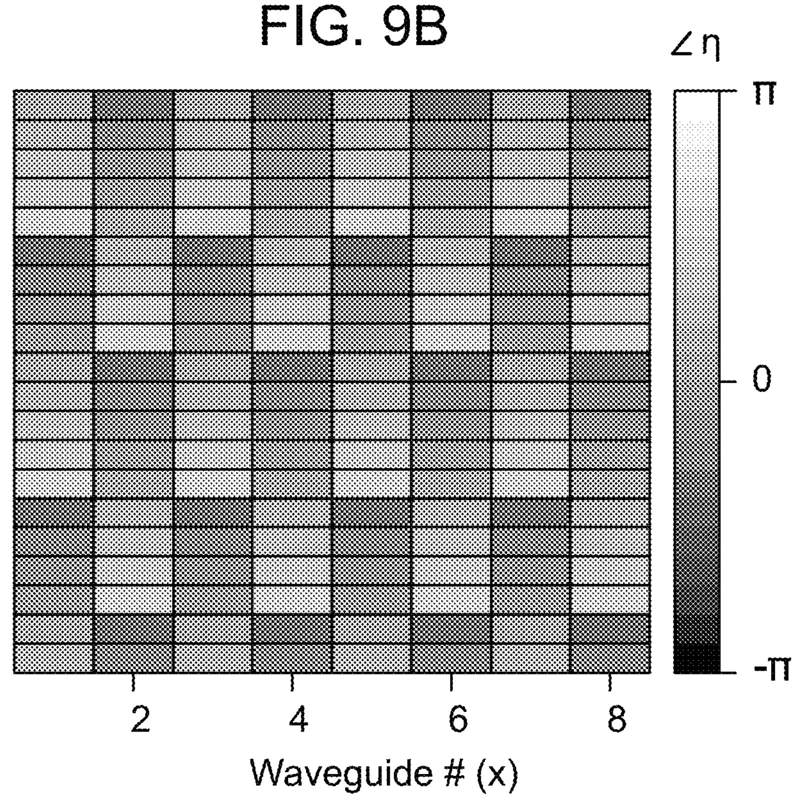
FIG. 9B also shows the dipole moments for the metamaterial elements in the corresponding metasurface antennas represented in the example antenna system.
Figure 10A:
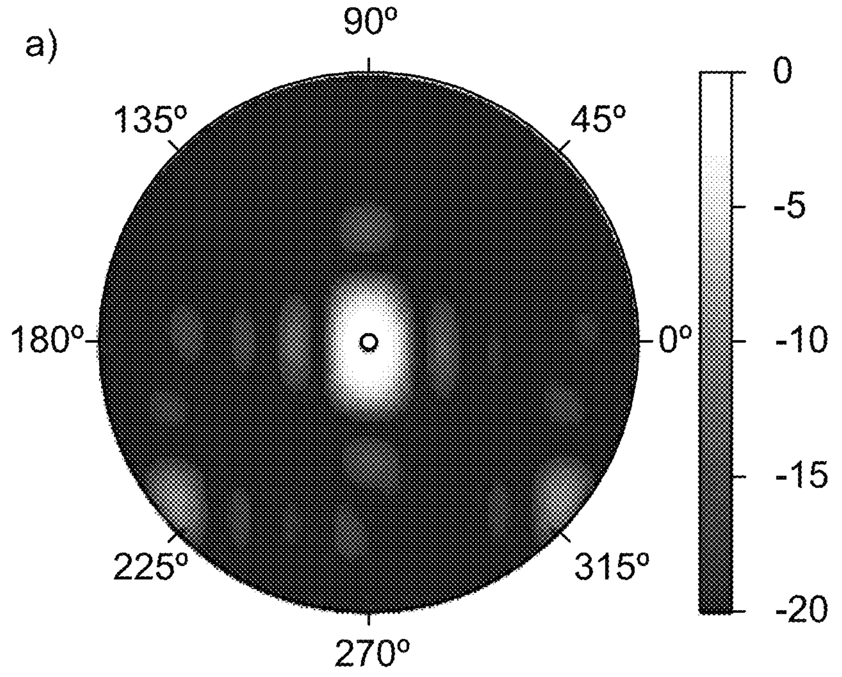
FIG. 10A shows a normalized farfield pattern created through the example antenna system that is fed with phase diverse input.
Figure 10B:
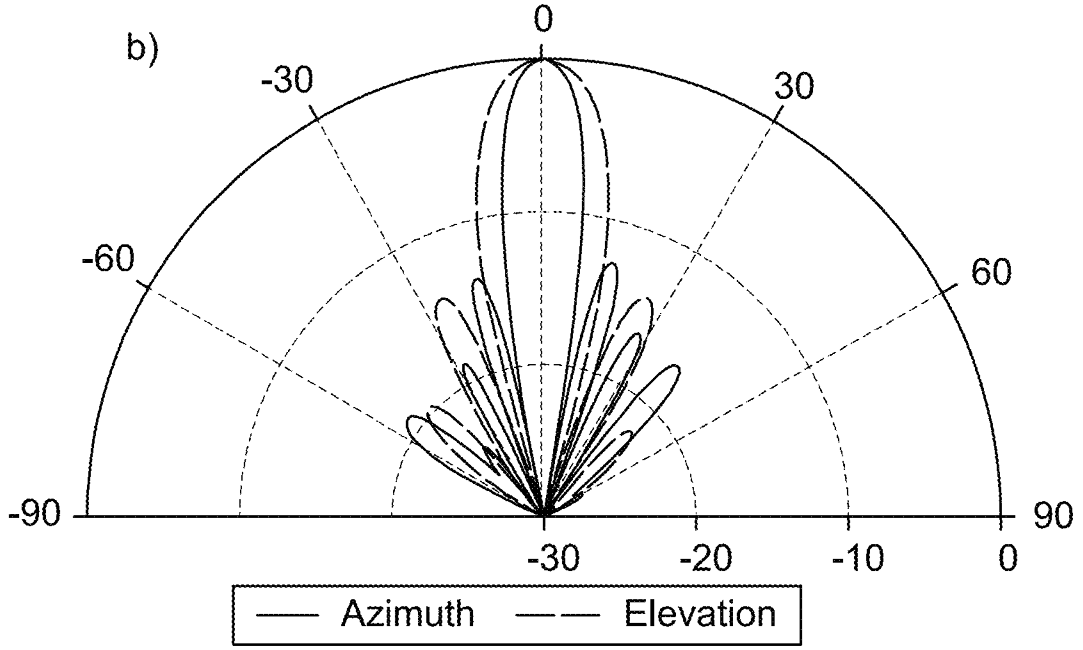
FIG. 10B shows a normalized farfield pattern created through the example metasurface antenna array system that is fed with phase diverse input.
Figure 11A:
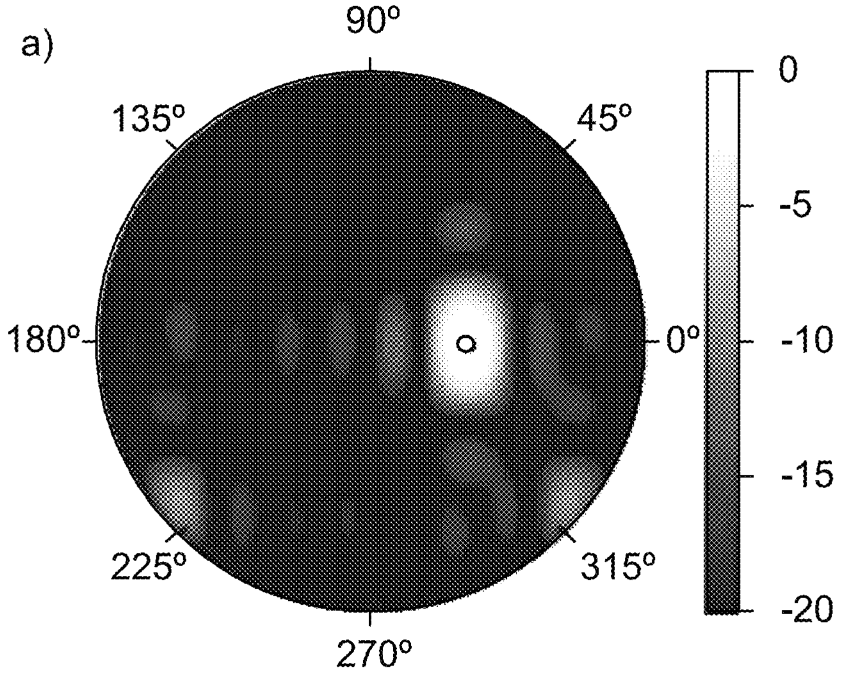
FIG. 11A shows a normalized farfield pattern created through the antenna system that is fed with diverse input and steered to 20° in azimuth.
Figure 11B:
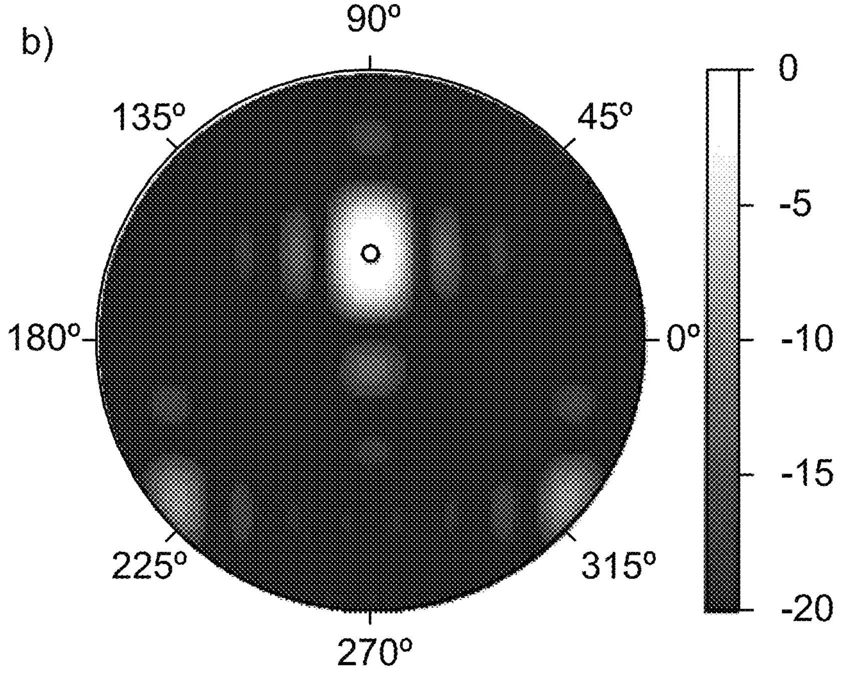
FIG. 11B shows a normalized farfield pattern created through the example antenna system that is fed with diverse input and steered to 20° in elevation.

In an example simulation of the example antenna system 800, M' was selected at 2. This can allow the feed waveguide to operate away from cutoff and help to ensure that the π phase shift between adjacent waveguides cancels or otherwise suppress grating lobes. FIG. 9A shows the dipole moments for the metamaterial elements in the corresponding metasurface antennas in the example antenna system 800. FIG. 9B also shows the dipole moments for the metamaterial elements in the corresponding metasurface antennas represented in the example antenna system 800. FIG. 10A shows a normalized farfield pattern created through the example antenna system 800 that is fed with phase diverse input. FIG. 10B shows a normalized farfield pattern created through the example metasurface antenna array system 800 that is fed with phase diverse input. As shown in FIGS. 10A and 10B the grating lobe is eliminated. Further, as the beam is steered, the grating lobe remains suppressed. Specifically, FIG. 11A shows a normalized farfield pattern created through the antenna system 800 that is fed with diverse input and steered to 20° in azimuth. FIG. 11B shows a normalized farfield pattern created through the example antenna system 800 that is fed with diverse input and steered to 20° in elevation.

M' can be selected based on various applicable factors. Such factors can include applicable characteristics of an antenna system. For example, M' can be selected based on waveguide width of either or both a radiating waveguide and a feed waveguide of an antenna system, dielectric materials used in the antenna system, and whether the feed waveguide is center or edge fed. Alternatively, M' can be randomly selected or otherwise defined.

Grating lobe suppression through application of phase diverse input can be realized across operational frequencies of an antenna system. Specifically, when the example antenna system 800 is simulated at 9.8 GHz, 10.0 GHz, and 10.2 GHz, grating lobe suppression is observed across the frequencies. These results can be improved by integrating the antenna system 800 with components that allow for high switching speeds. Specifically, when the antenna system 800 operates as a transmitter, the tuning state of the metamaterial elements can be updated as the operating frequency of the antenna system 800 changes. In turn, frequency squint can be mitigated in the antenna system 800.

While this disclosure has discussed using LCM, the systems and methods described herein can be implemented using an applicable tuning scheme. For example, the systems and methods described herein can be implemented through direct phase tuning or Euclidean modulation. Specifically, the polarizability of each element can be tuned to match the polarizability prescribed for beamforming. With respect to direct phase tuning, the tuning state of the metamaterial elements can be selected to decrease or otherwise minimize the phase difference between the polarizability expressed in Equation 6 and the polarizability available as a function of tuning state. With respect to Euclidean modulation, the tuning state of the metamaterial elements can be selected to decrease or otherwise minimize the Euclidean norm between the polarizability expressed in Equation 6 and the polarizability available as a function of tuning state.

Figure 12:
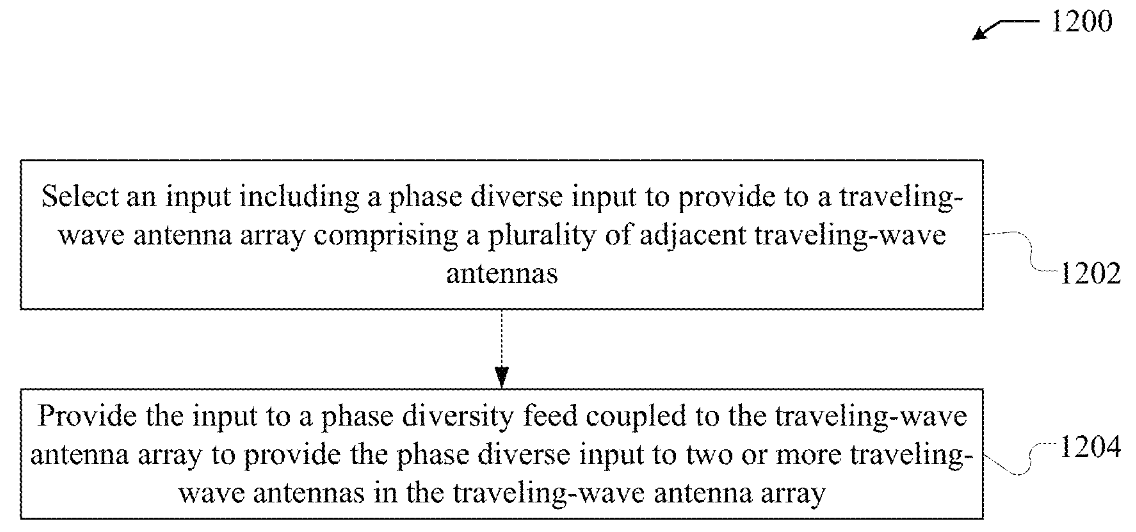
FIG. 12 is a flowchart of an example method of operating a traveling-wave antenna system with phase diverse input.

FIG. 12 is a flowchart 1200 of an example method of operating a traveling-wave antenna system with phase diverse input. The flowchart 1200 begins at step 1202, where an input to provide to a traveling-wave antenna array is selected. The input can include a phase diverse input. Further, the traveling-wave antenna array can include a plurality of adjacent traveling-wave antennas.

At step 1204, the input is provided to a phase diversity feed coupled to the traveling-wave antenna array. As follows, the phase diversity feed can provide the input to the traveling-wave antenna array. More specifically, the phase diversity feed can provide the phase diverse input to two or more traveling-wave antennas of the traveling-wave antenna array.

Figure 13:
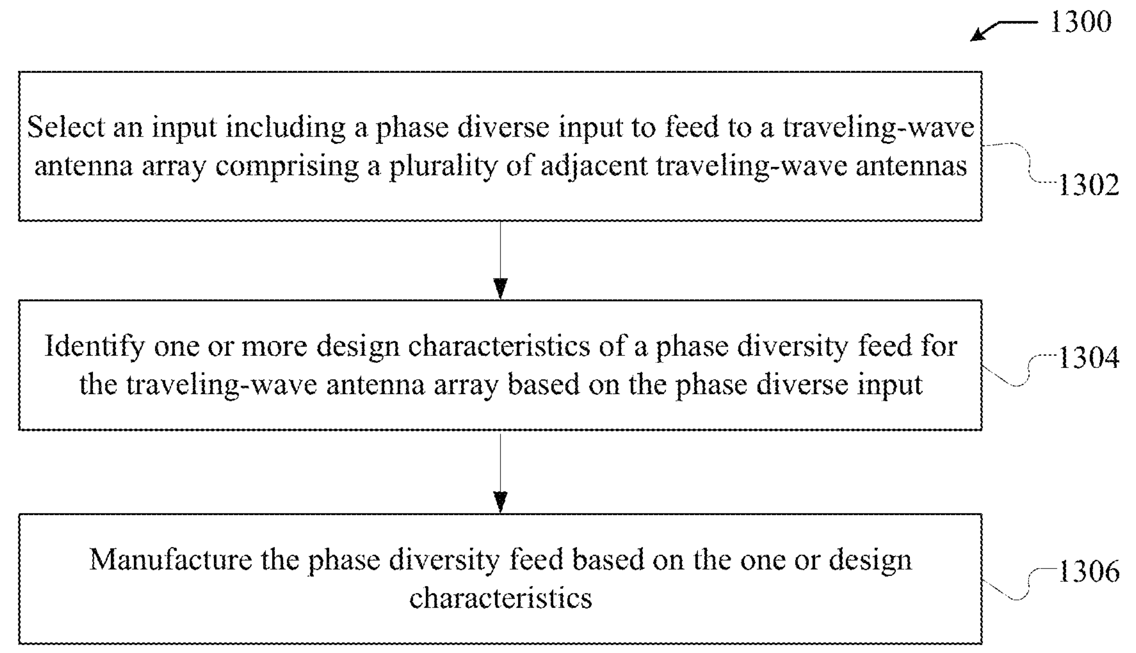
FIG. 13 is a flowchart of an example method of operating a traveling-wave antenna system with phase diverse input.

FIG. 13 is a flowchart 1300 of an example method of operating a traveling-wave antenna system with phase diverse input. The flowchart 1300 begins at step 1302, where an input to provide to a traveling-wave antenna array is selected. The input can include a phase diverse input. Further, the traveling-wave antenna array can include a plurality of adjacent traveling-wave antennas.

At step 1304, one or more design characteristics of a phase diversity feed for the traveling-wave antenna array are selected based on the phase diverse input. For example, the phase diversity feed can be designed on a circuit board using circuit elements that are selected based on the phase diverse input. At step 1306, the phase diversity feed is manufactured based on the one or more design characteristics that are identified based on phase diverse input.

This disclosure has been made with reference to various exemplary embodiments including the best mode. However, those skilled in the art will recognize that changes and modifications may be made to the exemplary embodiments without departing from the scope of the present disclosure. For example, various operational steps, as well as components for carrying out operational steps, may be implemented in alternate ways depending upon the particular application or in consideration of any number of cost functions associated with the operation of the system, e.g., one or more of the steps may be deleted, modified, or combined with other steps.

While the principles of this disclosure have been shown in various embodiments, many modifications of structure, arrangements, proportions, elements, materials, and components, which are particularly adapted for a specific environment and operating requirements, may be used without departing from the principles and scope of this disclosure. These and other changes or modifications are intended to be included within the scope of the present disclosure.

The foregoing specification has been described with reference to various embodiments. However, one of ordinary skill in the art will appreciate that various modifications and changes can be made without departing from the scope of the present disclosure. Accordingly, this disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, a required, or an essential feature or element. As used herein, the terms "comprises," "comprising," and any other variation thereof, are intended to cover a non-exclusive inclusion, such that a process, a method, an article, or an apparatus that comprises a list of elements does not include only those elements but may include other elements not expressly listed or inherent to such process, method, system, article, or apparatus. Also, as used herein, the terms "coupled," "coupling," and any other variation thereof are intended to cover a physical connection, an electrical connection, a magnetic connection, an optical connection, a communicative connection, a functional connection, and/or any other connection.

Those having skill in the art will appreciate that many changes may be made to the details of the above-described embodiments without departing from the underlying principles of the invention. The scope of the present invention should, therefore, be determined only by the following claims.

What is claimed is:

1. An apparatus comprising:

a traveling-wave antenna array comprising a plurality of adjacent metamaterial surface antennas comprising a waveguide or a cavity, each adjacent metamaterial surface antenna comprising an array of metamaterial radiators coupled to a surface of the waveguide or the cavity, each metamaterial radiator comprising an individually addressable tunable component that can be tuned over a spectral bandwidth to generate different radiation patterns; and a phase diversity feed coupled to the traveling-wave antenna array and configured to provide adjustable phase diverse input to two or more of the plurality of adjacent metamaterial surface antennas, the phase diverse input comprising a first phase for a first traveling-wave antenna and a second phase for a second traveling-wave antenna, the first phase being different from the second phase, wherein the phase diverse input is selected to suppress grating lobes for a directed beam pattern selected for transmission.

2. The apparatus of claim 1, wherein the phase diversity feed comprises a feed waveguide configured to provide input to the plurality of adjacent metamaterial surface antennas including the phase diverse input to the two or more of the plurality of adjacent metamaterial surface antennas.

3. The apparatus of claim 2, wherein the feed waveguide is coupled to each of the plurality of adjacent metamaterial surface antennas through a corresponding aperture and is configured to provide the input to the plurality of adjacent metamaterial surface antennas through the corresponding aperture coupling the feed waveguide to each of the plurality of adjacent metamaterial surface antennas.

4. The apparatus of claim 1, wherein the phase diversity feed comprises an array of passive phase shifters configured to provide input to the plurality of adjacent metamaterial surface antennas including the phase diverse input to the two or more of the plurality of adjacent metamaterial surface antennas.

5. The apparatus of claim 4, wherein each passive phase shifter in the array of passive phase shifters corresponds to a single traveling-wave antenna in the plurality of adjacent metamaterial surface antennas and specific passive phase shifters in the array of passive phase shifters that correspond to the two or more of the plurality of adjacent metamaterial surface antennas are configured to provide the phase diverse input to the two or more of the plurality of adjacent metamaterial surface antennas.

6. The apparatus of claim 1, wherein either or both the phase diverse input and the selected input are selected based on one or more characteristics of the traveling-wave antenna array.

7. The apparatus of claim 1, wherein the traveling-wave antenna array comprises at least four adjacent metamaterial surface antennas, and wherein the phase diverse input is selected to provide:

a phase to the second traveling-wave antenna that is offset by 90 degrees from a phase provided to the first traveling-wave antenna;

a phase to a third traveling-wave antenna that is offset by 180 degrees from a phase provided to the first traveling-wave antenna; and a phase to a fourth traveling-wave antenna that is offset by 270 degrees from a phase provided to the first traveling-wave antenna.

8. A method comprising:

adjusting an input to provide to a traveling-wave antenna array comprising a plurality of adjacent metamaterial surface antennas comprising a waveguide or a cavity, each adjacent metamaterial radiating waveguide antenna comprising an array of metamaterial radiators coupled to the waveguide or the cavity, each metamaterial radiator comprising an individually addressable tunable component that can be tuned over a spectral bandwidth to generate different radiation patterns, the adjusted input including a phase diverse input to provide to two or more of the plurality of adjacent metamaterial surface antennas, the phase diverse input comprising a first phase for a first traveling-wave antenna and a second phase for a second traveling-wave antenna, the first phase being different from the second phase, wherein the phase diverse input is selected to suppress grating lobes for a directed beam pattern selected for transmission; and providing the adjusted input to a phase diversity feed coupled to the traveling-wave antenna array to provide the phase diverse input to the two or more of the plurality of adjacent metamaterial surface antennas through the phase diversity feed.

9. The method of claim 8, wherein the phase diverse input is selected to provide a random or pseudo random phase offset between the two or more of the plurality of adjacent metamaterial surface antennas.

10. The method of claim 8, wherein the phase diverse input is selected to provide one of a 180°, 90°, or 45° phase offset between the two or more of the plurality of adjacent metamaterial surface antennas.

11. The method of claim 8, wherein either or both the phase diverse input and the input are selected based on one or more characteristics of the traveling-wave antenna array.

12. The method of claim 8, wherein the plurality of adjacent metamaterial surface antennas comprises either a plurality of adjacent metamaterial radiating waveguide antennas or a plurality of adjacent leaky wave antennas.

13. The method of claim 8, wherein the phase diversity feed comprises a feed waveguide configured to provide the input to the plurality of adjacent metamaterial surface antennas including the phase diverse input to the two or more of the plurality of adjacent metamaterial surface antennas.

14. The method of claim 8, wherein the phase diversity feed comprises an array of passive phase shifters configured to provide the input to the plurality of adjacent metamaterial surface antennas including the phase diverse input to the two or more of the plurality of adjacent metamaterial surface antennas.

15. The method of claim 8, wherein the traveling-wave antenna array comprises at least four adjacent traveling-wave antennas, and wherein the phase diverse input is selected to provide:

a phase to the second traveling-wave antenna that is offset by 90 degrees from a phase provided to the first traveling-wave antenna;

a phase to a third traveling-wave antenna that is offset by 180 degrees from a phase provided to the first traveling-wave antenna; and a phase to a fourth traveling-wave antenna that is offset by 270 degrees from a phase provided to the first traveling-wave antenna.

* * * * *